(12) United States Patent
Naderi et al.

(10) Patent No.: US 12,494,862 B2
(45) Date of Patent: Dec. 9, 2025

(54) JOINT RANDOM SUBCARRIER SELECTION AND CHANNEL-BASED ARTIFICIAL SIGNAL DESIGN AIDED PLS

(71) Applicant: Istanbul Medipol Universitesi, Istanbul (TR)

(72) Inventors: Sanaz Naderi, Istanbul (TR); Hüseyin Arslan, Istanbul (TR)

( * ) Notice: Subject to any disclaimer, the term of this patent is extended or adjusted under 35 U.S.C. 154(b) by 517 days.

(21) Appl. No.: 17/789,344

(22) PCT Filed: Feb. 15, 2021

(86) PCT No.: PCT/TR2021/050132
§ 371 (c)(1),
(2) Date: Jun. 27, 2022

(87) PCT Pub. No.: WO2021/167569
PCT Pub. Date: Jun. 28, 2021

(65) Prior Publication Data
US 2023/0082251 A1    Mar. 16, 2023

(30) Foreign Application Priority Data

Feb. 18, 2020 (TR) .................................. 2020/02472
Jul. 20, 2020 (TR) .................................. 2020/11489

(51) Int. Cl.
*H04L 29/06* (2006.01)
*H04K 1/00* (2006.01)
*H04K 1/02* (2006.01)

(52) U.S. Cl.
CPC ............... *H04K 1/003* (2013.01); *H04K 1/02* (2013.01)

(58) Field of Classification Search
CPC ... H04K 1/003; H04K 1/02; H04K 1/04; H04K 1/00; H04L 25/0202
See application file for complete search history.

(56) References Cited

U.S. PATENT DOCUMENTS 10,028,166 B2 * 7/2018 Dinan .................. H04W 12/04
10,439,755 B1   10/2019 Krunz et al.
(Continued)

FOREIGN PATENT DOCUMENTS

CN        109088891 A     12/2018

OTHER PUBLICATIONS

J. M. Hamamreh, E. Basar and H. Arslan, "OFDM-Subcarrier Index Selection for Enhancing Security and Reliability of 5G URLLC Services," in IEEE Access, vol. 5, pp. 25863-25875, 2017, doi: 10.1109/ACCESS.2017.2768558 (Year: 2017).*
(Continued)

*Primary Examiner* — Yogesh Paliwal
(74) *Attorney, Agent, or Firm* — Egbert, McDaniel & Swartz, PLLC

(57) ABSTRACT

In the area of Joint Random Subcarrier Selection and Channel-Based Artificial Signal Design Aided PLS, a method for providing physical layer security (PLS) depending on the randomness of wireless channel is proposed. Specifically, a channel-based joint random subcarrier selection and artificial signal design are introduced to protect the communication in the presence of a passive eavesdropper which can be even stronger than the legitimate receiver. Our analysis assumes a window-based subcarrier selection method in which the strongest subcarriers in each window are selected. Chosen subcarriers are considered for secret sequence extraction. The generated channel dependent secret sequence is used for both random subcarrier selection and artificial signal design. We evaluate the efficiency of the proposed method through some representative metrics, such as secret sequence disagreement rate (SSDR), throughput and bit error rate (BER), in both perfect and imperfect channel estimation cases. Simulation results are presented and insightful discussions are drawn.

1 Claim, 6 Drawing Sheets

(56) References Cited

U.S. PATENT DOCUMENTS

Figure 1:
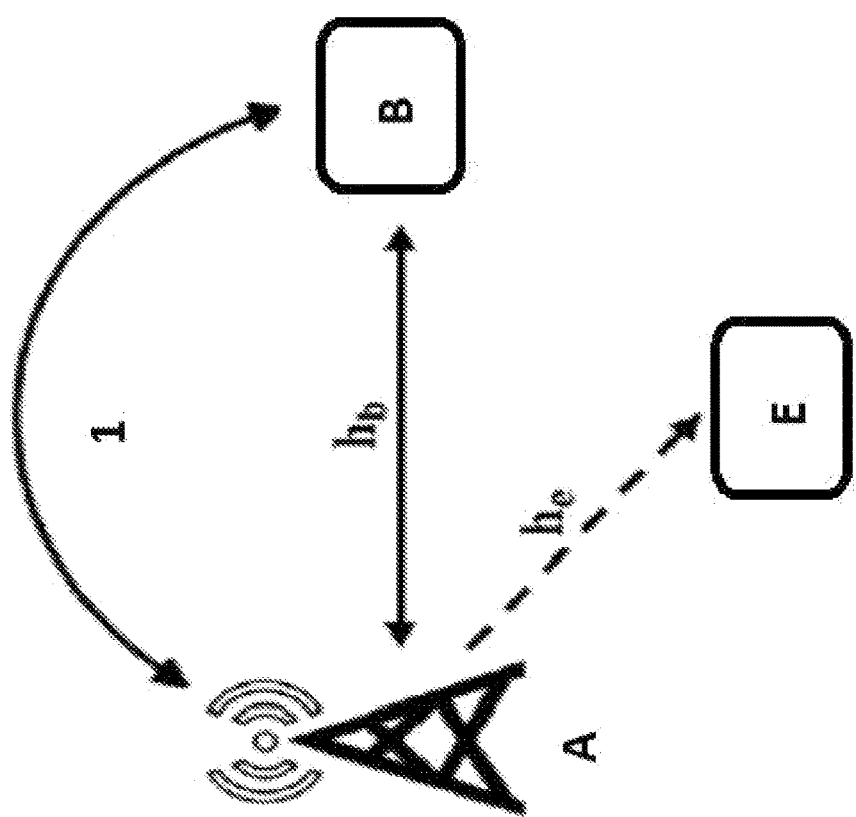

| | | | |
|---|---|---|---|
| 2005/0123138 A1* | 6/2005 | Abe | H04K 1/00 |
| | | | 380/255 |
| 2007/0036353 A1* | 2/2007 | Reznik | H04L 63/0428 |
| | | | 380/30 |
| 2014/0232528 A1 | 8/2014 | Han et al. | |
| 2015/0208412 A1* | 7/2015 | Nakamura | H04L 27/2666 |
| | | | 370/329 |
| 2019/0229833 A1 | 7/2019 | Ha et al. | |

OTHER PUBLICATIONS

Two practical random-subcarrier-selection methods for secure precise wireless transmissions. IEEE Transactions on Vehicular Technology 68.9 (2019): 9018-9028 (Year: 2019).*
International Search Report for corresponding PCT/TR2021/050132 dated Jun. 4, 2021.
Written Opinion of the International Searching Authority for corresponding PCT/TR2021/050132 dated Jun. 4, 2021.

* cited by examiner

JOINT RANDOM SUBCARRIER SELECTION AND CHANNEL-BASED ARTIFICIAL SIGNAL DESIGN AIDED PLS

TECHNICAL FIELD

In this invention, a novel method for providing physical layer security (PLS) depending on the randomness of wireless channel is proposed. Specifically, a channel-based joint random subcarrier selection and artificial signal design are introduced to protect the communication in the presence of a strong passive eavesdropper. Our analysis assumes a window-based subcarrier selection method in which the strongest subcarriers in each window are selected. Chosen subcarriers are considered for secret sequence extraction. In addition the generated channel dependent secret sequence is used for both random subcarrier selection and artificial signal design.

PRIOR ART

There are many works in the literature proposing different techniques for providing security, such as jamming [1] and artificial noise [2], [10]. However, such techniques not only consume more power, but also in some cases it can hurt the legitimate receiver in addition to cause peak-to-average power ratio (PAPR) issue if it is not well-designed [3]. On the other hand, other works in the literature propose to add noise on only those subcarriers which are in deep fading and, using only strong subcarriers for data transmission, may cause spectral efficiency loss as it is not being used the whole band for data transmission. [4].

Due to the broadcast nature of wireless transmission, securing data in the presence of illegitimate users has been considered as a critical issue. Physical-layer based solutions is bringing another degree of freedom due to their flexibility, which makes physical layer methods a promising solution to deal with these problems. In particular, providing security by extracting secret sequence from the wireless channel [5] using time-division duplexing (TDD) mode has been introduced as an effective way since randomness arises quite critical in such techniques [6]. Moreover, temporal correlation has been regarded a vital issue in secret key extraction from the channel characteristics [7].

AIMS OF THE INVENTION AND BRIEF DESCRIPTION

The present invention is related to a method for joint random subcarrier selection and channel-based artificial signal design aided physical layer security (PLS) in order to eliminate the disadvantages mentioned above and to bring new advantages to the related technical field.

The proposed method can provide secure communication for wireless systems without depending on the conventional cryptography based security solutions. Proposed algorithm also can solve the critical problem in physical layer security such as key sharing which is existed in conventional cryptography methods. Plus, in this method subcarrier selection is done randomly based on the generated secret sequence which bring another layer of security. Proposed method for joint random subcarrier selection and artificial signal design alleviates both co-located attacks and temporal correlation issue in physical layer security techniques such as secret key generation from wireless channel characteristics.

A novel method for providing physical layer security (PLS) depending on the randomness of wireless channel is proposed. Specifically, a channel-based joint random subcarrier selection and artificial signal design are introduced to protect the communication in the presence of a passive eavesdropper which can be even stronger than legitimate user. Our analysis assumes a window-based subcarrier selection method in which the strongest subcarriers in each window are selected. Chosen subcarriers are considered for secret sequence extraction. In addition the generated channel dependent secret sequence is used for both random subcarrier selection and artificial signal design. We evaluate the efficiency of the proposed method through some representative metrics, such as secret sequence disagreement rate (SSDR), throughput and bit error rate (BER), in both perfect and imperfect channel estimation cases.

The proposed method provides secure communication without depending on the conventional cryptography based security solutions which their key needs to be shared in legitimate nodes. The proposed method can solve the following problems in conventional methods like key sharing in physical layer security:

1. For future wireless network due the large number of nodes which are existed in the network, key management and key sharing are challenging.
2. There will be need for some future networks to support different kind of services and scenarios with various security requirements and the conventional encryption-based method cannot provide flexible security.
3. Alleviating temporal correlation problem in the secret key generation from wireless channel characteristics technique, which in this problem the channel is not changing too much over the time.
4. Generating more uncorrelated secret sequence at legitimate node with the generated secret sequence at illegitimate node.
5. Generating more reliable secret sequence only for legitimate receiver.
6. Alleviating co-located attacks in physical layer security techniques.
7. Providing secure communication by hiding the transmitter's secret message due to the adding channel based artificial signal to the secret data. Illegitimate receiver cannot access to the secret data as the secret sequence is generated only based on the legitimate receiver's channel. As illegitimate receiver is experiencing different channel which is uncorrelated with legitimate receiver channel due to his/her location which is located more than half wavelength far from legitimate user, so he/she cannot generate the same secret sequence as legitimate user.

In this invention, differently from previous works, a window-based subcarrier selection method is proposed which chooses the strongest subcarriers in each window. The secret sequence is then generated from these chosen subcarriers. By applying this methodology, the coherence bandwidth of the channel is decreased inherently, which is useful to achieve higher level of randomness in generated secret sequence. Furthermore, a random subcarrier selection method is proposed with the aim to select some of the subcarriers which carry the artificial signal plus information data to confuse eavesdropper. This random selection method is done by dividing the generated secret sequence into small sub-blocks for representing subcarrier numbers in each window. Due to the randomness of the secret sequence, the proposed subcarrier selection scheme is totally random, which is beneficial from a security prospective. Finally, all the steps of the proposed method are based on legitimate's channel, which improves even more the reliability and security of the system.

Two random subcarrier selection schemes are proposed:

The first one is a window-based subcarrier selection using strongest subcarriers of each window for secret sequence extraction. Proposed method chooses some subcarriers out of all which are the strongest ones. Compared to the case of using all subcarriers, this selection provides a more uncorrelated secret sequence with Eve and, at the same time, more reliability at Bob because the chance of having the same selected subcarriers in both nodes decreases. This method helps to solve co-located attacks issue in physical layer security techniques. On the other hand, window-based scheme generates sequence from a set of subcarriers out of all which cause to have more uncorrelated subcarriers at legitimate's user channel, compared with using all subcarriers. This helps to increases the randomness of the generated secret sequence.

The second one is a channel-based random subcarrier selection for the sake of adding artificial signal to the information data to protect the transmitter's confidential data. It is noteworthy that the subcarrier selection methods existing in the literature choose those subcarriers which are located in deep fade parts of the wireless channel. However, there may have some cases that the channels of Eve and Bob are close to each other which makes these techniques not secure due to the co-located attacks issue [7]. Thus, our proposed method aims to solve this problem by choosing the subcarriers based on the sequence which is extracted by Bob's channel. In this case, even if the Bob's and Eve's channels are close, the generated sequences and chosen subcarriers are still different.

A method for adding artificial signal design to the secret data is proposed which causes to hide the secret message from the eavesdropper since she/he does not have access to the artificial signal and cannot get any benefit out of his/her received signal.

In order to get useful insights, representative performance metrics are investigated, such as secret sequence disagreement rate (SSDR), bit error rate (BER) and throughput of window-based subcarrier selection and the comparison with scheme using all subcarriers are provided.

The transpose operation is represented by (.)T, Hadamard division is symbolized by ø, convolution is denoted by *, and |D| stands for the cardinality of set D.

The proposed method provides more reliable secret sequence by extracting bits only from strong subcarriers in each window (those subcarriers that has the highest channel gains among all subcarriers in each window).

The proposed algorithm insures secure communication without depending on the conventional cryptography based secure solutions which these methods suffers from secret key sharing in all legitimate nodes.

The proposed algorithm is applicable to provide flexible security for wireless systems.

The proposed method introduces a way for adding artificial signal design to the secret data which causes to hide the transmitter's secret message from the eavesdropper since she/he does not have access to the artificial signal and cannot get any benefit out of his/her received signal.

DEFINITION OF THE FIGURES OF THE INVENTION

The figures have been used in order to further disclose the joint random subcarrier selection and channel-based artificial signal design aided physical layer security (PLS) developed by the present invention which the figures have been described below:

FIG. 1: System model consisting of a single-antenna transmitter (Alice), a single-antenna legitimate receiver (Bob), and a single-antenna eavesdropper (Eve).

In FIG. 1:
A: Is the transmitter which is called Alice
B: Is the legitimate receiver which is called Bob
E: Is the eavesdropper which is called Eve
1: Is the reference signal between transmitter and legitimate receiver which is used for channel estimation purpose.

Figure 2:
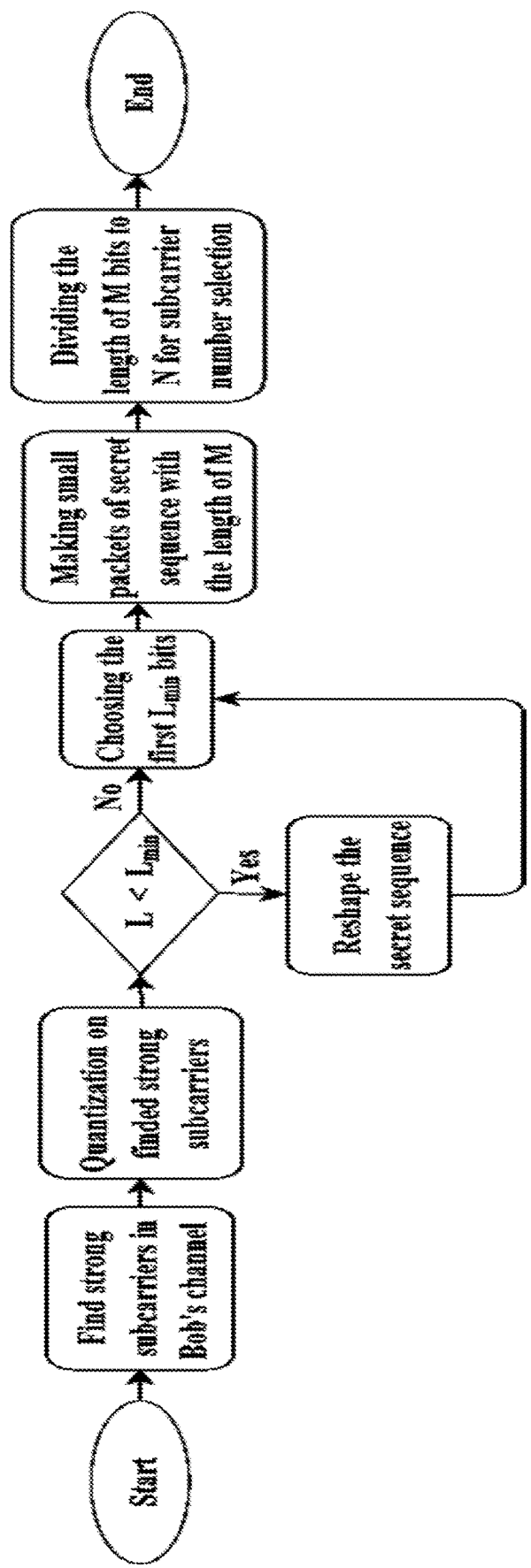

FIG. 2: Flowchart of the proposed algorithm for random subcarrier selection.

Figure 3:
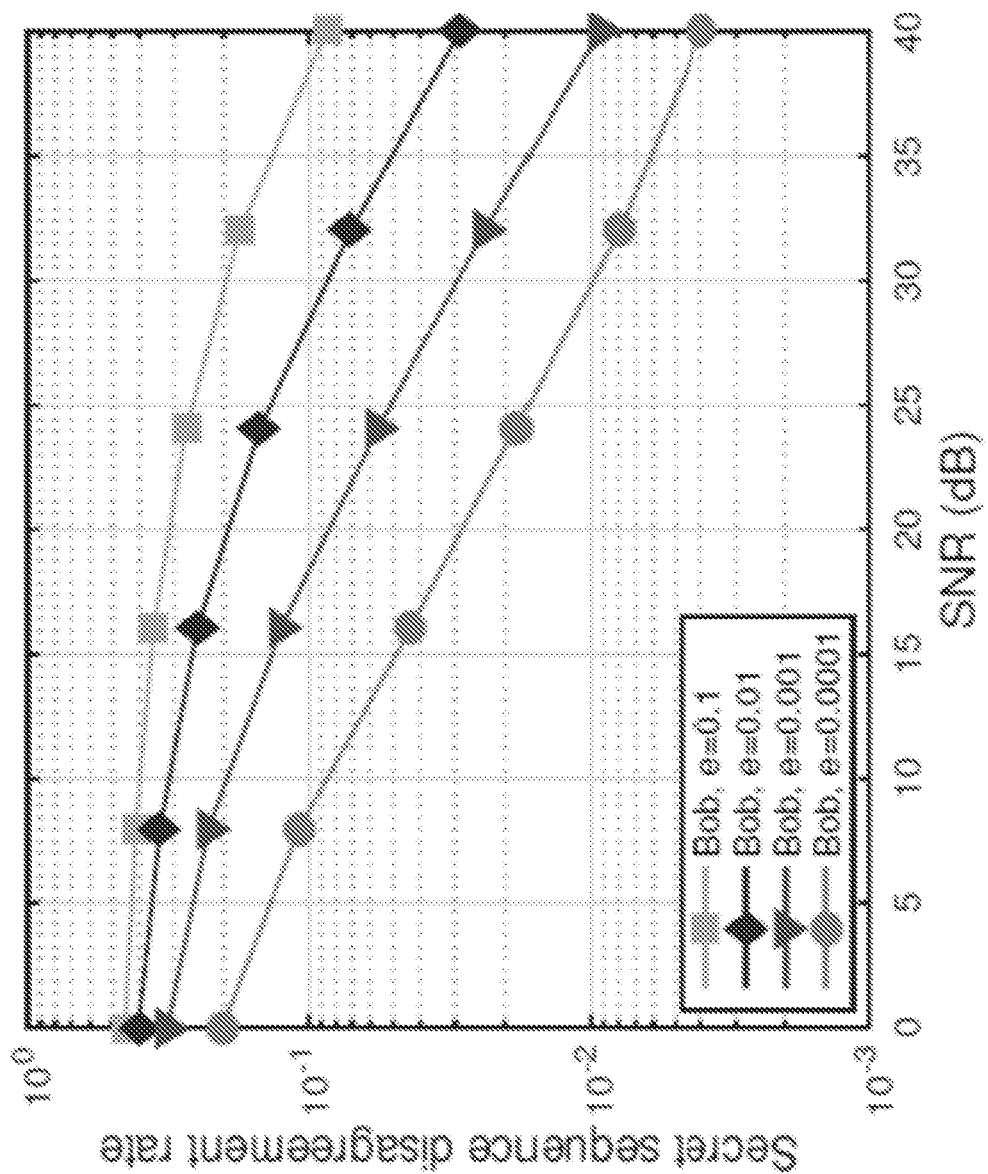

FIG. 3: Effect of imperfect channel reciprocity on extracted secret sequence in the proposed technique.

In FIG. 3:
SNR(dB): Is the signal to noise ratio.
e: Is the noise power which is used to show the level of imperfect channel reciprocity.
Bob: Is the legitimate user.

Figure 4:
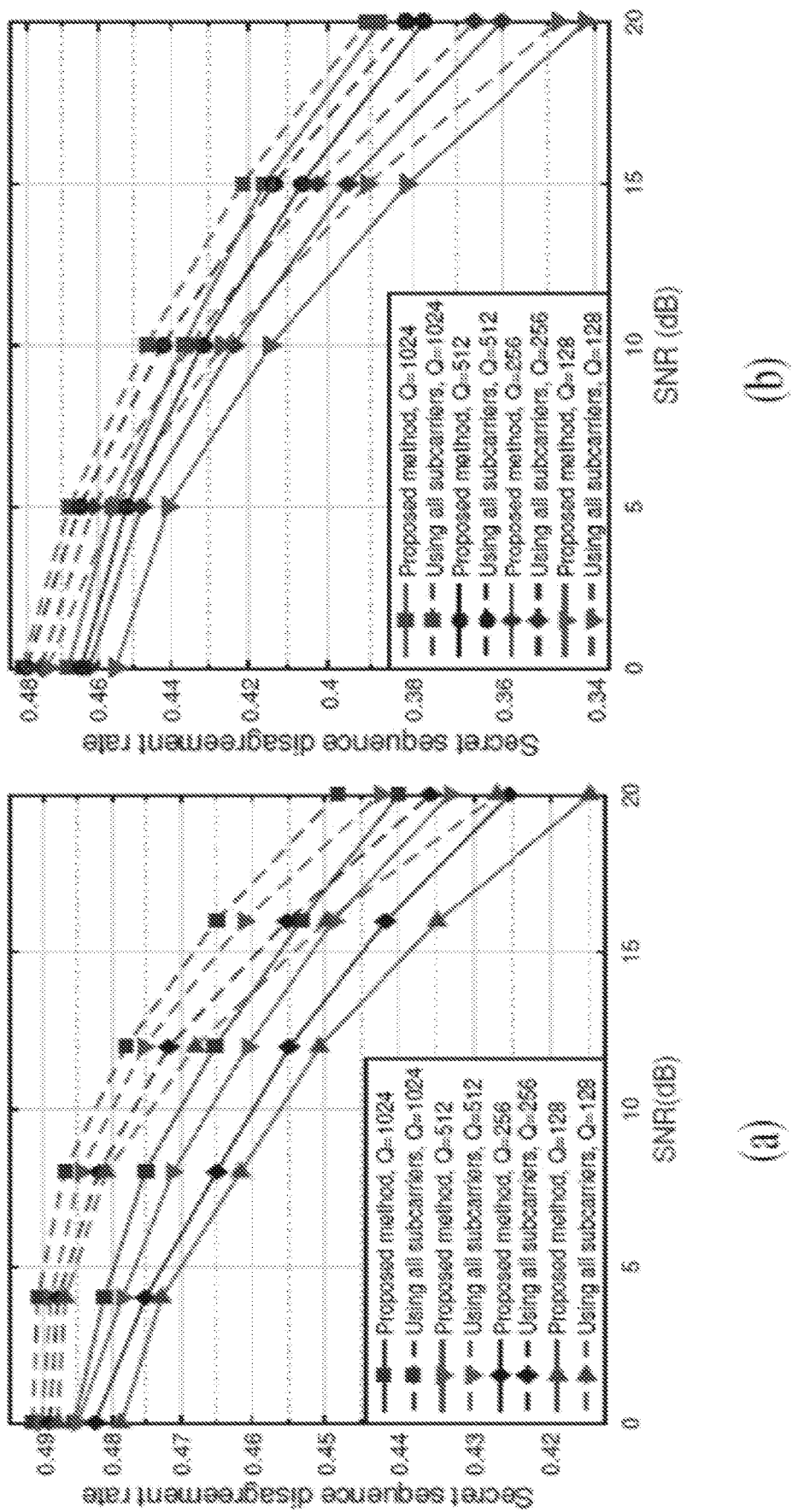

FIG. 4: SSDR comparison between the proposed window-based subcarrier selection method and the scheme using all subcarriers for secret sequence extraction: a) e=1, b) e=0.1.

In FIG. 4 for both a and b part:
SSDR: Is the secret sequence disagreement rate.
Q: Is the quantization level which is applied on chosen strong subcarriers to generate secret sequence.
SNR(dB): Is the signal to noise ratio.

Figure 5:
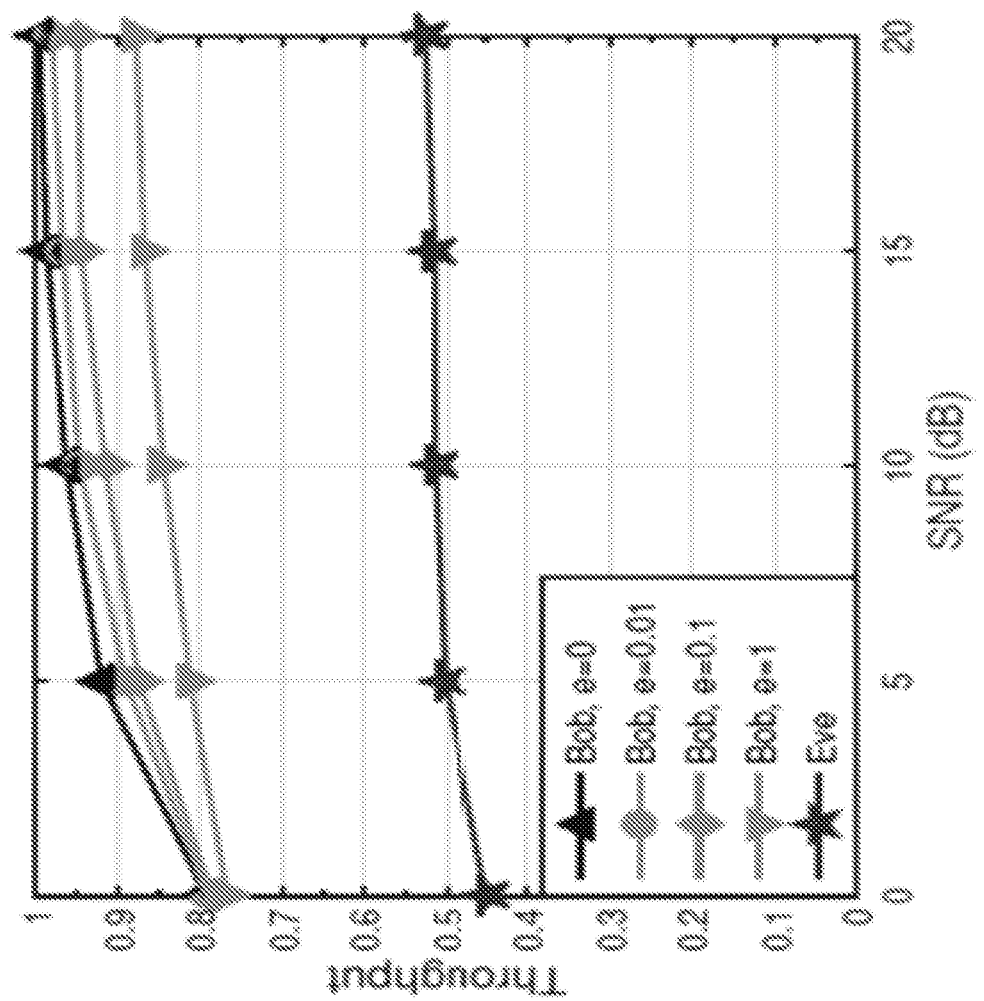

FIG. 5: Throughput performance of the proposed approach

In FIG. 5:
SNR(dB): Is the signal to noise ratio.
e: Is the noise power which is used to show the level of imperfect channel reciprocity.
Bob: Is the legitimate user.
Eve: Is the eavesdropper.

Figure 6:
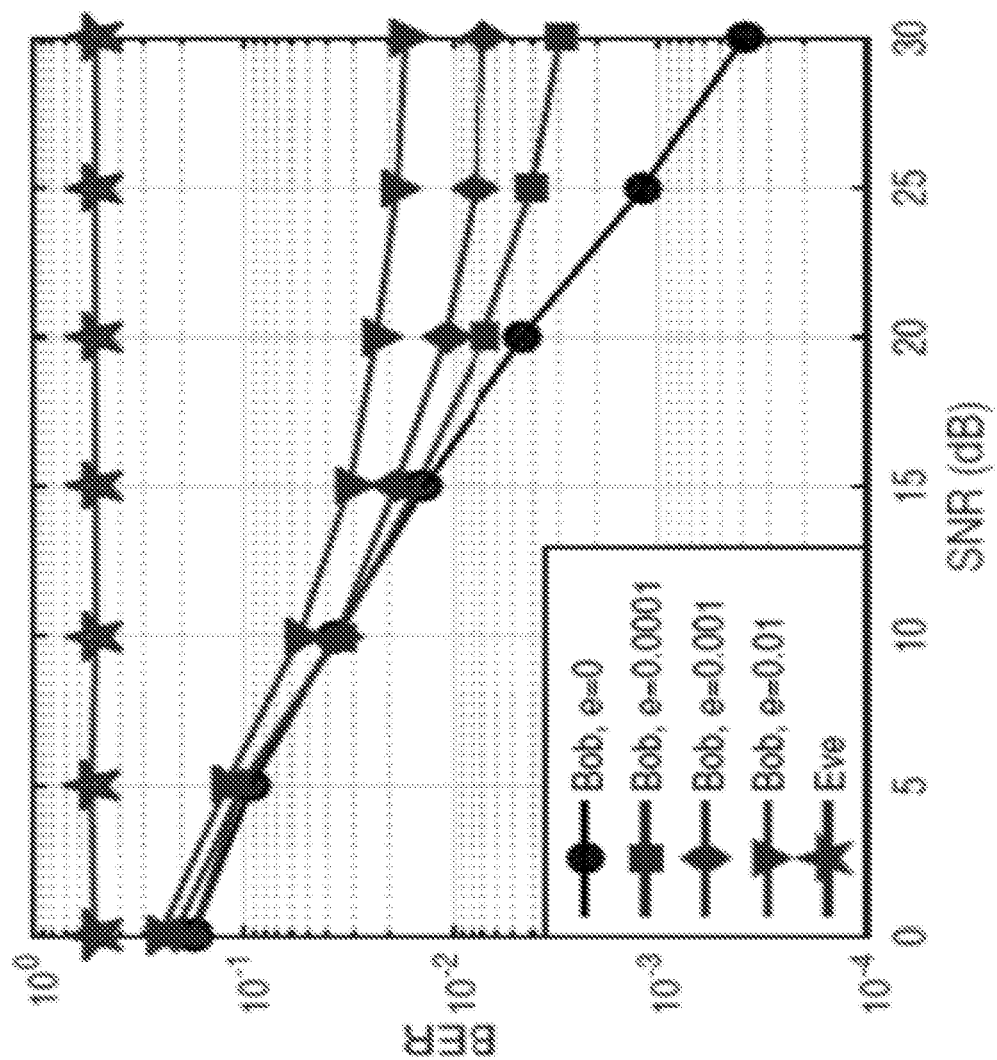

FIG. 6: BER performance of the proposed approach.
In FIG. 6:
BER: Is the bit error rate.
SNR(dB): Is the signal to noise ratio.
e: Is the noise power which is used to show the level of imperfect channel reciprocity.
Bob: Is the legitimate user.
Eve: Is the eavesdropper.

DETAILED DESCRIPTION OF THE INVENTION

The novelty of the invention has been described with examples that shall not limit the scope of the invention and which have been intended to only clarify the subject matter of the invention. The present invention has been described in detail below.

A novel method for physical layer security was presented. A channel-based random subcarrier selection and artificial signal design were proposed. High level of randomness due to window-based subcarrier selection achieved in the generated secret sequence as this subcarrier selection method implied in more uncorrelated subcarriers. Moreover, this method improved reliability for generated secret sequence only at legitimate node as well. Finally, the proposed window-based subcarrier selection method was compared with the scheme using all subcarriers for secret sequence extraction and results revealed the effectiveness of our method. For future works, an active eavesdropper instead of a passive eavesdropper can be considered. In the proposed method, this is challenging for finding the legitimate user while sending pilot signals for channel estimation purposes.

System Model:

System model consisting of a single-antenna transmitter (Alice), a single-antenna legitimate receiver (Bob), and a single-antenna eavesdropper (Eve).

The scenario considered in this patent contains a transmitter, called Alice, which sends a secret data and communicate confidentially with a legitimate user, called Bob, in the presence of a passive eavesdropper, called Eve. Eve's aim is to access the secret message content from the communication link between Alice and Bob through his/her own observations of the signals. Eve can be stronger than Bob in the sense of having multiple antennas, more power, off-line processing, hardware capabilities and better signal processing skills, and his/her location is not known by the transmitter. It is assumed that the channels of Bob and Eve are independent and uncorrelated from each other which means Eve is located at least half-wavelength away from Bob. Also, all received signals experience Rayleigh frequency-selective fading channel. It is assumed that the channel state information (CSI) of Bob is known at Alice by using the reciprocity property in a TDD system, but Alice doesn't have any knowledge about Eve's channel, since she/he is passive. Therefore, the channels between Alice and Bob, Alice-to-Bob and Bob-to-Alice, are assumed to be estimated as correlated with each other in TDD mode [8].

In considered scenario, Bob first transmits a reference signal to Alice. Then, Alice estimates the channel between herself and Bob using this reference signal. Exploiting the channel reciprocity property in TDD mode, in which the downlink channel is obtained from its uplink [9], there is no need to share the channel. The proposed method is based on using orthogonal frequency division multiplexing (OFDM) system. The bits, which are mapped by using BPSK modulation, are sent by Alice to Bob, in the presence of a passive Eve. The frequency-domain complex data symbols having the length of K is represented by $S=[S_1, S_2, \ldots, S_K]$, where $S \in \mathbb{C}^{1 \times K}$.

A. Secret Sequence Extraction:

The frequency response of the channel experienced by Bob and Eve are denoted by $H_b \in \mathbb{C}^{K \times 1}$ and $H_e \in \mathbb{C}^{K \times 1}$, respectively, where K denotes the channel length. The secret sequence is extracted by applying proposed window-based subcarriers selection method. In this method, firstly the length of window, W, is determined. This length shows the total number of subcarriers which are considered in each window. In addition, let P be the number of selected subcarriers (P<W) out of W points which are selected from the frequency response of Bob's channel whose gains are the highest ones among all subcarriers in each window, $H_b = [H_{b_1}, H_{b_2}, \ldots, H_{b_K}]^T$. These P subcarriers corresponding to the strongest subcarriers in each window are considered by Alice to extract the secret sequence. The proposed window-based method selects only strong subcarriers from channel. The number P of selected subcarriers is assumed to be fixed in each window. Extracting secret sequence from these P points increases the randomness of the Bob's channel and makes his generated secret sequence more uncorrelated with eavesdropper's one. It is worth to mention that such a method decreases the correlation between Bob's channel and eavesdropper's channel, implying in more selective channel at Bob automatically. This is done without using any filter or any other techniques which has cost and complexity.

B. Random Subcarriers Selection:

Random subcarriers selection method is proposed to select those subcarriers which are considered to carry both artificial signal and secret data. After selecting strong subcarriers in each window of $H_b$, Bob's channel is quantized by Alice and Bob to construct a secret sequence from these chosen strong subcarriers. Bob's channel gain measurements are equally divided into regions and each region is quantized into multibit quantization levels by both Alice and Bob. Each of the selected subcarriers corresponds to a bit stream. In the proposed method, a minimum length of secret sequence is required, and it is represented by $L_{min}$. This minimum length is defined as $L_{min} = |I_{TSC}| \times N$, where N shows the number of bits that are defining a subcarrier number and $|I_{TSC}|$ denotes the total number of subcarriers. The relation between W and N is defined by $W = 2^N$. The length of secret sequence is related to the number of chosen subcarriers. In other words, it is related to the length of window, W, and used subcarriers in each window, P. Considering these two parameters, there exist some cases in which the length of secret sequence, L, is less than the minimum required length, $L < L_{min}$. In this case, the generated secret sequence is reshaped to reach the desired length which is $L_{min}$. The length of secret sequence is subtracted from minimum length of secret sequence, $L_{min}$ then secret sequence samples from the head are added as a suffix to achieve the minimum required length, $L_{min}$. On the other hand, if the length of secret sequence is higher than minimum required length, $L > L_{min}$, only the first $L_{min}$ bits are considered for random subcarriers selection algorithm. In order to ensure minimum required length, $L_{min}$ the secret sequence is divided into small blocks with length M. Length of each sub-block, M, represents the total number of bits in each window. The number of bits that represents a subcarrier number, N, is defined by $M = W \times N$. Since this secret sequence is channel dependent and the channel is random, the chosen subcarriers are selected randomly. Total number of subcarriers is expressed as $|I_{TSC}|$ and the number of selected subcarriers applying random subcarrier selection method as $|I_{SSC}|$. The ratio between $|I_{SSC}|$ and $|I_{TSC}|$ is defined as $$0 < \left(\frac{|I_{SSC}|}{|I_{TSC}|}\right) \leq 1,$$

which is random. As this ratio goes close to 1, the security level of system becomes higher. There exist some cases in which one specific subcarrier number is repeated more than one time in a window. In this case, this subcarrier number is counted one time and the repetition is not considered. FIG. 2 represents the flowchart of the proposed algorithm. It shows all steps and details of the proposed random subcarrier selection method.

C. Artificial Signal Design and how to Add it to the Information Signal:

After choosing subcarriers randomly, the artificial signal needs to be added to information signal in these specific subcarriers, while remaining subcarriers are carrying only information signal. For designing artificial signal, the extracted secret sequence from the channel is modulated with same order as information data. The proposed method for adding artificial signal is defined as $$X(k) = \begin{cases} S(k) + C(k), & \text{if } k \in I_{SSC}, \\ S(k), & \text{otherwise}, \end{cases} \quad (1)$$

where S stands for the information signal and C is the generated secret sequence, and $I_{SSC}$ is the set of selected subcarriers. In (1), k refers to the index of each symbol, indicating whether it belongs to $I_{SSC}$ set. For those k which belong to $I_{SSC}$, modulated secret sequence is added to information data with the same index. The transmitted signal, $X \in \mathbb{C}^{1 \times K}$, is sent to the legitimate user, Bob, after applying cyclic prefix (CP) to the time-domain encrypted symbols to avoid intersymbol interference (ISI). The received signal at Bob's side can be written as $$y_b = h_b * x + n_b, \quad (2)$$

where $h_b$ is the Bob's channel in time-domain, x is the transmitted signal, and $n_b$ is the zero-mean complex additive white Gaussian noise (AWGN) at Bob. After removing CP and applying serial-to-parallel (S/P) conversion on the time domain received signal, $y_b$, Bob uses fast Fourier transform (FFT) on the resulting signal. A zero-forcing channel equalization process is performed. The received signal at Bob's side after channel equalization process is found by element-wise division of the received signal and his channel, and it can be defined as $$\widehat{X_b} = Y_b \oslash H_b, \quad (3)$$

where $H_b$ is the Bob's channel in frequency-domain and $Y_b$ is the frequency-domain received signal after S/P conversion. After P/S conversion, Bob generates the information signal by subtracting the artificial signal from his received signal, $\widehat{X_b}$. The information signal is observed as $$S_b(k) = \begin{cases} \widehat{X_b}(k) - C_b(k), & \text{if } k \in I_{SSC_b}, \\ \widehat{X_b}(k), & \text{otherwise}, \end{cases} \quad (4)$$

where $C_b$ is the modulated secret sequence generated at Bob and $S_b$ is data symbols after subtraction from received symbols, $\widehat{X_b}$. Moreover, $I_{SSC_b}$ refers to the selected subcarriers set at Bob. Eve has also access to the transmitted signal, x and as she can be stronger than Bob and more capability, she follows the same steps as Bob to generate her own secret sequence from her channel. The signal which Eve captures from her channel, $H_e$, can be defined as $$y_e = h_e * x + n_e, \quad (5)$$

where $h_e$ denotes the Eve's channel in time-domain and $n_e$ means zero-mean complex AWGN noise. The received signal at Eve's side after channel equalization process can be defined as $$\widehat{X_e} = Y_e \oslash H_e, \quad (6)$$

where $Y_e$ is the frequency-domain is received signal after S/P conversion and $H_e$ is the Eve's channel in frequency domain. Eve generates her information signal by following the same algorithm as Bob based on her channel. The extracted information signal in Eve can be expressed as $$S_e(k) = \begin{cases} \widehat{X_e}(k) - C_e(k), & \text{if } k \in I_{SSC_e}, \\ \widehat{X_e}(k), & \text{otherwise}, \end{cases} \quad (7)$$

where $C_e$ stands for the modulated secret sequence at Eve, $S_e$ is data symbols after subtracting from his/her received symbols, $\widehat{X_e}$, and $I_{SSC_e}$ is the selected subcarriers set at Eve. It is important to note that both Bob and Eve follow the same steps in order to achieve the secret data which they received from the transmitter, Alice. Since Alice transmits the data using the secret sequence which was extracted from Bob's channel, Bob can securely receive this signal in the presence of Eve. Although Eve can have multiple antennas and more skills than Bob, she cannot have access to the information data correctly even if she extracts her own secret sequence, and apply the proposed method for finding jammed subcarriers and artificial signal.

D. Illustrative Case:

In this section, an illustrative case is presented in order to gain further insights. The length of window is assumed to be W=4 and P=1. Based on the previous methodology, the parameters are provided in TABLE I.

TABLE I

An example of proposed random subcarrier selection method.

| Parameters: W = 4, P = 1, M = 8, N = 2, L_TSC = 20, LSSC = 14. | Extracted sequence in each window | Corresponding subcarrier numbers | Considered subcarrier numbers for adding artificial signal |
|---|---|---|---|
| First window | 10111001 | {2, 3, 2, 1} | {1, 2, 3} → {2, 3, 4} |
| Second window | 01110111 | {1, 3, 1, 3} | {1, 3} → {6, 8} |
| Third window | 11101100 | {3, 2, 3, 0} | {0, 2, 3} → {9, 11, 12} |
| Fourth window | 10001010 | {2, 0, 2, 2} | {0, 2} → {13, 15} |
| Fifth window | 00100111 | {0, 2, 1, 3} | {0, 1, 2, 3} → {17, 18, 19, 20} |

In this example, the minimum required length for secret sequence is 40 and the length of generated secret sequence considering quantization level of 6 is 30. The first 10 bits from sequence are added as a suffix to the end, to reach the desired length. The resulting bits are divided into small sub-blocks with length 8, where each 2 bits represent a subcarrier number from 1 to 4. Finally, those specific modulated secret sequence symbols with the same index of the chosen subcarriers are considered to be added with the same index of information symbols. From the information provided in TABLE I, it can be concluded that the ratio between randomly selected subcarriers and total number of subcarriers is 0.7 which is high. This means that 70% of subcarriers are jammed so that they carry artificial signal plus information data and it is somehow impossible for Eve to find them. Due to the exploiting channel reciprocity property, channel between legitimate nodes are same and Bob knows which subcarriers are jammed so that he can decode his data correctly. However, even if Eve follows the same steps, her selected subcarriers are not same of Alice and Bob because of her different channel. This means that Eve cannot find the right jammed subcarriers to decode her data correctly.

Performance Analysis and Results:

Simulation results are presented to analyze the performance and prove the efficiency of the proposed method. The effectiveness of our proposed method is evaluated by means of bit error rate (BER) performance, secret sequence disagreement rate (SSDR), and throughput. In addition, comparison of the proposed window-based subcarrier selection method with the scheme using all subcarriers for secret sequence extraction is carried out in terms of SSDR, which represents the percentage of the number of different bits between Alice's and Bob's generated sequences for different variance values. In this particular study, BPSK modulation is used to map the bits to transmitted symbols of length 64. A Rayleigh fading channel with a total number of 5 taps with decaying power delay profile is generated for both Bob and Eve. The quantization level of secret sequence generation is determined as 64. Total number of subcarriers is considered to be 64. The window length is 4 and P=1. Imperfect channel reciprocity and estimation error are considered as well. Specifically, the estimated channel for Alice and Bob are expressed as $\hat{H}_a = H_a + \Delta H_a$ and $\hat{H}_b = H_b + \Delta H_b$, respectively. $H_a = H_b$ are the true channels of Alice and Bob, respectively. Also, $\Delta H_a$ and $\Delta H_b$ are independent Gaussian noise vectors at Alice's and Bob's sides with zero-mean and variance $\sigma^2 = e \times 10^{-SNR(dB)/10}$ respectively. One of the most important metrics considered in secret sequence generation systems is randomness. The randomness of the proposed channel dependent secret sequence is checked by using a run test for randomness command, h=runstest(x), in MATLAB. The test results in h=0 for random sequence, as expected.

FIG. 3 plots the SSDR versus transmit SNR by assuming imperfect channel reciprocity. It is shown that when e decreases, SSDR also decreases. For example, at SNR=16 dB, from e=0.1 to e=0.0001, SSDR decreases from 0.3622 to 0.0421, respectively, which results in a gain of 88%. FIG. 4 compares the SSDR performance of the proposed method with the scheme using all subcarriers for extracting secret sequence. It is considered different quantization levels and channel estimation errors. As can be seen, the proposed method achieves a huge gap in worst case scenario, which is e=1. For example, for SSDR=0.48 in the case of Q=1024, FIG. (4a) shows that the proposed method achieves around 9 dB gain, which proves the efficiency of the proposed method. Same interpretation is valid for FIG. (4b), in which it is shown that the proposed method achieves around 5 dB gain, for the case of SSDR=0.457 and Q=128. Also, higher quantization level increases the SSDR due to the generation of more number of bits from each subcarrier.

FIGS. 5 and 6 plot throughput and BER, respectively, versus SNR considering different channel estimation errors. Note that the proposed method provides high throughput performance for considered system due to the usage of all the subcarriers for data transmission which cause to achieve high spectral efficiency. For example, in FIG. 5 at SNR=10 dB, for the worst case e=1, the value for throughput at Bob is 0.8443 while at Eve is 0.5139, which shows that the proposed technique achieves 40% gain in throughput at the legitimate user. Also in FIG. 6 at SNR=20 dB and assuming e=0.01, the value of BER at legitimate user is 0.0233 and at Eve is 0.5052, which proves that the proposed method provides 95% BER gain at Bob. The secret sequence which are used for throughput and BER calculation are extracted in high SNR values, SNR=40 dB.

In this patent, a novel method for physical layer security was presented. A channel-based random subcarrier selection and artificial signal design were proposed. High level of randomness due to window-based subcarrier selection achieved in the generated secret sequence. This subcarrier selection method implied in more uncorrelated subcarriers which improved reliability in extracted secret sequence only at legitimate user. The jammed subcarriers were chosen depends on the generated secret sequence based on Bob's channel. Lastly, those specific modulated secret sequence symbols with the same index of the chosen subcarriers were considered to be added with the same index of information symbols. As all the steps in proposed method were done based on Bob's channel, it was ensured both security and reliability only at Bob. Imperfect channel reciprocity conditions were also considered. Besides, simulation results showed a huge secrecy gap between Bob's and Eve's BER, which proves the efficiency of proposed method. Finally, the proposed window-based subcarrier selection method was compared with the scheme using all subcarriers for secret sequence extraction and results revealed the effectiveness of our method. For future works, an active eavesdropper instead of a passive eavesdropper can be considered. In the proposed method, this is challenging for finding the legitimate user while sending pilot signals for channel estimation purposes.

This invention is applicable to industrialization and the proposed method can be used to provide secure and reliable communication in wireless systems for the future communication networks and systems.

A joint random subcarrier selection and channel-based artificial signal design aided physical layer security (PLS) wherein the system is characterized by comprising; Two random subcarrier selection schemes as a window-based subcarrier selection which is using strongest subcarriers of each window for secret sequence extraction and a channel-based random subcarrier selection for the sake of adding artificial signal to the information data to protect the transmitter's confidential data.

An operation method of a joint random subcarrier selection and channel-based artificial signal design aided physical layer security (PLS) system wherein the method comprising;
  Finding strong subcarriers in a single-antenna legitimate receiver channel,
  Quantization on found strong subcarriers and secret sequence generation,
  Comparing minimum required length of secret sequence ($L_{min}$) and L,
  If comparing minimum required length ($L_{min}$) is bigger than L, reshaping of the secret sequence, then choose the first $L_{min}$ bits,
  If comparing minimum required length ($L_{min}$) is not bigger than L then choose the first $L_{min}$ bits,
  After choosing the $L_{min}$ bits, make small packets of secret sequence with the length of M,
  Dividing the length of M bits to N for subcarrier number selection,
  After doing subcarriers number selection based on the generated secret sequence, adding artificial signal to the information data to protect the transmitter's confidential data,
  In this step;
    For designing artificial signal, the extracted secret sequence from the channel is modulated with the same order as information data,
    Sending the transmitted signal as $X \in \mathbb{C}^{1 \times K}$ to the legitimate user (a single-antenna legitimate receiver) after applying cyclic prefix (CP) to the time-domain encrypted symbols to avoid inter symbol interference (ISI),
    Receiving the signal as a $y_b = h_b * x + n_b$ at a single-antenna legitimate receivers side,
    After removing CP and applying serial-to-parallel (S/P) conversion on the time domain received signal, using the fast Fourier transform (FFT) on the resulting signal by single-antenna legitimate receiver,
    Performing a zero-forcing channel equalization process,
    Receiving the transmitter's signal (a) at single-antenna legitimate receivers side after channel equalization process is found by element-wise division of the received signal and his channel, as a $\widehat{X_b} = Y_b \oslash H_b$, After P/S conversion, legitimate receiver (b) generating the information signal by single-antenna legitimate receivers by subtracting the artificial signal from single-antenna legitimate receivers received signal,
Extracting the information signal as a $$S_b(k) = \begin{cases} \widehat{X_b}(k) - C_b(k), & \text{if } k \in I_{SSC_b}, \\ \widehat{X_b}(k), & \text{otherwise}, \end{cases}$$

The transmitted signal can be accessed by single-antenna eavesdropper and eavesdropper can generate secret sequence from her single-antenna channel,
Capturing the signal as a $y_e = h_e * x + n_e$ from single-antenna eavesdroppers channel,
Receiving the signal at the single-antenna eavesdropper side after channel equalization process as $\widehat{X_e} = Y_e \oslash H_e$,
Generating the single-antenna eavesdropper information signal by the single-antenna eavesdropper based on her channel by following the same algorithm as a single-antenna legitimate receiver,
Extracting information signal in a single-antenna eavesdropper can be expressed as $$S_e(k) = \begin{cases} \widehat{X_e}(k) - C_e(k), & \text{if } k \in I_{SSC_e}, \\ \widehat{X_e}(k), & \text{otherwise}, \end{cases}.$$

Embodiments of the invention are;
A joint random subcarrier selection and channel-based artificial signal design aided physical layer security (PLS) system helps to alleviate the co-located attacks and temporal correlation problem in physical layer security techniques such as secret key generation from wireless channel characteristics.
A method for a joint random subcarrier selection and channel-based artificial signal design aided physical layer security (PLS) wherein only strong subcarriers out of whole in each window has chosen to extract more reliable and high randomness secret sequence at legitimate receiver.

REFERENCES

[1] Z. Bouida, A. Stavridis, A. Ghrayeb, H. Haas, M. Hasna, and M. Ibnkahla, "Precoding-aided spatial modulation for the wiretap channel with relay selection and cooperative jamming," Wireless Commun. Mob. Comp., 2018.
[2] B. He, Y. She, and V. K. N. Lau, "Artificial noise injection for securing single-antenna systems," IEEE Trans. Veh. Technol., vol. 66, no. 10, pp. 9577-9581, 2017.
[3] J. M. Hamamreh, H. M. Furqan, and H. Arslan, "Classifications and applications of physical layer security techniques for confidentiality: A comprehensive survey," IEEE Commun. Surveys & Tut., 2018.
[4] E. Gvenkaya and H. Arslan, "Secure communication in frequency selective channels with fade-avoiding subchannel usage," IEEE Int. Conf. Commun. (ICC), pp. 813-818, 2014.
[5] A. Badawy, T. Elfouly, T. Khattab, C.-F. Chiasserini, A. Mohamed, and D. Trinchero, "Robust secret key extraction from channel secondary random process," Wireless Commun. Mob. Comp., vol. 16, no. 11, pp. 1389-1400, 2016.
[6] J. Zhang, T. Q. Duong, A. Marshall, and R. Woods, "Key generation from wireless channels: A review," IEEE Access, vol. 4, pp. 614-626, 2016.
[7] L. Jiao, N. Wang, P. Wang, A. Alipour-Fanid, J. Tang, and K. Zeng, "Physical layer key generation in 5G wireless networks," IEEE Wireless Commun. Mag., 2019.
[8] X. Zhou, L. Song, and Y. Zhang, Physical Layer Security in Wireless Communications. CRC Press, 2016.
[9] A. Goldsmith, Wireless Communications. Cambridge University Press, 2005.
[10] N. Zhao, Y. Cao, F. Yu, Y. Chen, M. Jin, and V. C. Leung, "Artificial noise assisted secure interference networks with wireless power transfer," IEEE Trans. Veh. Technol., vol. 67, no. 2, pp. 1087-1098, February 2018.

The invention claimed is:

1. A process for joint random subcarrier selection and channel-based artificial signal design aided physical security system, the physical security system having a pair of random subcarrier selection schemes for window-based subcarrier selection using a strongest subcarrier selection scheme of the pair of random subcarrier selection schemes of each window to achieve a secret sequence extractions and a channel-based random selection of the pair of random subcarrier selection schemes to add an artificial signal to information data in order to protect confidential data of a transmitter, the process comprising:

finding the strongest subcarrier selection scheme into a single-antenna receiver channel;

quantizating the strongest subcarrier selection scheme and the secret sequence extractions;

choosing minimum required length bits of one of the secret sequence extractions when the one of the secret sequence extractions is larger than another of the secret sequence extractions;

choosing a first minimum required length bits when one, of the secret sequence extractions is less than the another of the secret sequence extractions;

forming small packets of the secret sequence extractions with a length of M bits after the steps of choosing;

dividing the length of the M bits to N for a subcarrier selection number;

adding an artificial signal to the information data to protect the confidential data of the transmitter, wherein the secret sequence extractions form the single-antenna receiver channel is modulated in a same order as a modulation of the information data;

sending a signal from the transmitter as $X \in \mathbb{C}^{1 \times K}$ to a single-antenna legitimate receiver after applying a cyclic prefix to time-domain encrypted signals so as to avoid intersymbol interference;

receiving the sent signal as $y_b = h_b * x + n_b$ by the single-antenna legitimate receiver;

applying serial-to-parallel conversion on the received signal after removing the cyclic prefix by using a fast Fourier transform to the received signal;

preforming a zero-forcing channel equalization process to the converted signal;

element-wise dividing the received signal and the channel associated therewith;

applying a parallel to serial conversion to the received signal;

extracting an information signal in accordance with $$S_b(k) = \begin{cases} \widehat{X_b}(k) - C_b(k), & \text{if } k \in I_{SSC_b}, \\ \widehat{X_b}(k), & \text{otherwise,} \end{cases} \quad 5$$

capturing the information signal in accordance with $y_e = h_e * x + n_e$ from a single-antenna eavesdroppers channel;

receiving the captured information signal at a side of the single-antenna eavesdropper channel alter the zero-forcing channel equalization;

generating the single-antenna channel eavesdropper information signal by the single-channel eavesdropper channel in accordance with a same algorithm as the single-antenna legitimate receiver; and extracting the information signal from the single-antenna eavesdropper channel in accordance with $$S_e(k) = \begin{cases} \widehat{X_e}(k) - C_e(k), & \text{if } k \in I_{SSC_e}, \\ \widehat{X_e}(k), & \text{otherwise,} \end{cases}.$$

\* \* \* \* \*